United States Patent [19]

Dighe et al.

[11] 4,328,849
[45] May 11, 1982

[54] VEHICLE TIRE WITH TRACTIVE ELEMENTS

[75] Inventors: Deepak V. Dighe, Troy, Mich.; Earl F. Burton, Townville, S.C.; Robert J. Wozniak, Troy, Mich.

[73] Assignee: Uniroyal, Inc., Middlebury, Conn.

[21] Appl. No.: 161,084

[22] Filed: Jun. 19, 1980

[51] Int. Cl.³ ............... B60C 27/06; B62D 55/24
[52] U.S. Cl. .................... 152/176; 152/182; 152/185.1; 152/188; 152/228; 305/19; 305/38; 305/54
[58] Field of Search ............. 152/185.1, 188, 191, 152/222, 226, 228, 172, 225 R, 225 C, 233, 241, 175, 176, 179, 182; 301/41 R, 44 R; 305/19, 34, 35 R, 38, 40, 54

[56] References Cited

U.S. PATENT DOCUMENTS

| | | | |
|---|---|---|---|
| 3,776,291 | 12/1973 | Boggs | 152/185.1 |
| 3,871,720 | 3/1975 | Mosshart et al. | 152/185.1 |
| 3,899,220 | 8/1975 | Grawey et al. | 152/185.1 |
| 4,043,609 | 8/1977 | Vidakovic et al. | 152/179 X |
| 4,071,068 | 1/1978 | Olsen | 152/176 |
| 4,135,564 | 1/1979 | Müller et al. | 152/182 |

*Primary Examiner*—John E. Kittle
*Assistant Examiner*—Thomas Bokan
*Attorney, Agent, or Firm*—Norbert P. Holler; Jack Posin

[57] ABSTRACT

A vehicle tire with tractive elements for positive engagement with the ground surface is disclosed. The tire carcass has a tread including raised features. Means for positively linking tractive elements positioned radially outwardly of the tread to the raised features of the tread are provided in the form of a flexible but substantially inextensible belt positioned radially outwardly of the tread, and retainer elements positioned radially inwardly of the belt, the tractive elements being positioned radially outwardly of the belt and being releasably attached to the retainer elements for clamping the belt tightly therebetween. Inflation pressure within the carcass expands its crown region to maintain the belt in a taut condition. The retainer elements are sectionally constructed to facilitate assembly and disassembly of the tire.

7 Claims, 8 Drawing Figures

VEHICLE TIRE WITH TRACTIVE ELEMENTS

BACKGROUND OF THE INVENTION

The present invention relates to pneumatic tires, and relates more particularly to pneumatic tires intended for use in heavy, off-the-road equipment.

Throughout this disclosure, the directions and orientations of elements of tires will be described in terms of their orientation relative to the tire itself. Thus, the term "axially," when used to describe the orientation of an element of a tire, should be understood as meaning "in a direction parallel to the axis of revolution of the tire." The term "circumferential" should be understood as meaning "along the circumference of the tire." Also, the relative positions of tire elements will be described as "radially inward" or "radially outward" of one another. Thus, if a first element of a tire is located radially inwardly of a second element, it should be understood that the first element lies closer to the axis of revolution of the tire than the second element.

Pneumatic tires for off-the-road equipment, such as graders, scrapers, front-end loaders and the like must meet severe service requirements. They are exposed to the constant threat of damage from rocks and other sharp objects on the ground. They must support the enormous weight of the equipment, while transmitting substantial "tractive forces." "Tractive forces" are forces such as those which arise in braking and acceleration of the vehicle and which are directed circumferentially of the tire.

For example, one type of known front-end loader has a gross weight of 96,000 pound in the fully loaded condition. Because the weight of the vehicle is sometimes distributed unevenly among the tires, each of the four tires to be used on such a vehicle must be capable of supporting a load of about 46,000 pounds. Each such tire must be capable of transmitting a tractive force of about 29,000 pounds. If the tires do not transmit the tractive forces to the ground, the wheels of the vehicle will simply spin uselessly. Of course, these tires must be capable of operation even under adverse conditions such as mud, loose sand, and snow.

Several basic approaches have been taken to the design of such tires. In the most conventional approach, a bold ribbed tread is molded integrally with the tire. The tread, consisting of molded rubber ribs, engages the ground surface. However, the ribs of the tread may not dig into the ground to adequately transmit the tractive forces. Also, sharp objects can penetrate the tread and rupture the tire carcass.

In another approach, as set forth in U.S. Pat. No. 3,612,624, issued to Stedman, the tire is provided with a plurality of metal plates arranged around its periphery. These plates are joined by link pins to form an endless chain of ground-engaging elements extending around the circumference of the tire, radially outwardly of the tread. The link pins fit into slots defined by axially extensive ribs of the tire tread. The link pins engage the ribs of the tread to provide a positive mechanical drive connection between the tire carcass and the endless chain of plates. This approach has several disadvantages. For one, the link pins and the plates are subject to wear at each joint. This wear is aggravated by the intrusion of dirt into the joints during operation. It is extremely difficult to prevent such intrusion, as off-the-road equipment tires are constantly exposed to dirt. For another, the chain of links and plates is relatively complex, and is difficult to maintain or repair under field conditions.

A third approach is set forth in U.S. Pat. No. 3,773,394, issued to Grawey, and in U.S. Pat. No. 3,871,720, issued to Mosshart et al. In this approach, the tire is also provided with a plurality of plates or tractive elements arranged around its periphery. However, rather than being linked together into a chain, the plates or tractive elements are attached to an endless belt which lies radially inwardly of the plates or tractive elements but radially outwardly of the tire. Retainer elements lie radially inwardly of the belt, and each tractive element is attached to a retainer element. The belt is clamped between each tractive element and the attached retainer element so that the belt links all of the tractive elements and all of the retainer elements together. The tire has a smooth tread without ribs, and it is constructed and arranged so that at least its radially outwardmost or crown region is radially and circumferentially extensible. Thus, under the influence of inflation pressure, the crown region of the tire expands until it bears against the retainer elements. The frictional engagement between the outer surface of the crown region of the tire and the retainer elements links the assembly of the tractive elements, belt, and retainer elements to the tire.

Although this approach avoids the problems of compexity and wear at the joints associated with the chain of plates and link pins of the aforementioned approach, it is subject to other difficulties. Because the assembly of the tractive elements, retainer elements, and belt is merely frictionally engaged with the tire carcass, this assembly can slip circumferentially of the carcass under tractive loads during operation. To overcome this difficulty, the inflation pressure within the tire may be increased so that the crown region of the tire bears against the retainer elements with greater force. For example, a typical tire constructed in accordance with this approach employs an inflation pressure of 130 pounds. However, there are practical limits beyond which the inflation pressure within the tire may not be increased. As will be appreciated, the inflation pressure within the tire tends to pull the belt taut, so that if the inflation pressure within the tire were increased without limit, the stress on the belt would eventually be so great as to cause it to break. In addition, the stress applied to the belt by the inflation of the tire is increased still further by the tractive loads which the belt must transmit. Also, the greater the inflation pressure, the greater the stress imposed on the tire sidewalls, and the greater the chance of a destructive and potentially dangerous tire explosion. Finally, as the inflation pressure within the tire is increased, the tire becomes less flexible and will not insulate the vehicle from shocks generated when the tire encounters a bump in the ground surface, which not only can cause operator discomfort but can also place additional stresses on the frame and other components of the vehicle.

SUMMARY OF THE INVENTION

It is a principal object of the present invention to provide a positive drive linkage between a pneumatic tire carcass and a plurality of tractive elements mounted around its periphery without sacrificing the advantages of the aforementioned tractive element, belt, and retainer element assembly, such as simplicity and relative freedom from wear.

It is a further object of the present invention to provide a vehicle tire which does not require high inflation pressures in order to transmit substantial tractive loads, and which therefore can be utilized at only moderate inflation pressures to provide substantial cushioning to the vehicle which it supports.

Preferably, the tire of the present invention includes a carcass constructed and arranged so that at least its crown region is substantially circumferentially and radially extensible. The carcass includes a tread which overlies at least a portion of the crown region. The tread includes a plurality of raised features spaced around the circumference of the carcass. A flexible endless belt extends around the crown region of the carcass readily outwardly of the tread. The belt is substantially inextensible, at least in the circumferential direction.

A plurality of retainer elements are mounted between the belt and the tread. A plurality of tractive elements are mounted around the periphery of the tire radially outwardly of the belt. Each of the tractive elements is associated with at least one of the retainer elements and is attached to the retainer element or elements associated with it, and at least one element of each set of associated tractive and retainer elements is positively mechanically linked to at least one of the raised features of the tread to limit circumferential displacement of the tractive elements relative to the tread. Thus, upon inflation of the tire carcass, the belt will limit the circumferential and radial expansion of the crown region of the carcass, and the belt will be maintained in a taut condition to prevent the retainer elements from moving radially outwardly. Because the tractive elements are attached to the retainer elements, the former too cannot become detached from the tire during operation. Moreover, because either the tractive elements or the retainer elements are positively linked to the raised features of the tread, substantial tractive forces may be transmitted regardless of the occurrence or non-occurrence of any frictional engagement between the retainer elements and the tread.

These and other objects, features, and advantages of the present invention will be more readily apparent from the following detailed description of preferred embodiments thereof, when read in conjunction with the accompanying drawings.

DETAILED DESCRIPTION OF THE PREFERRED EMBODIMENTS

Figures 1, 2:
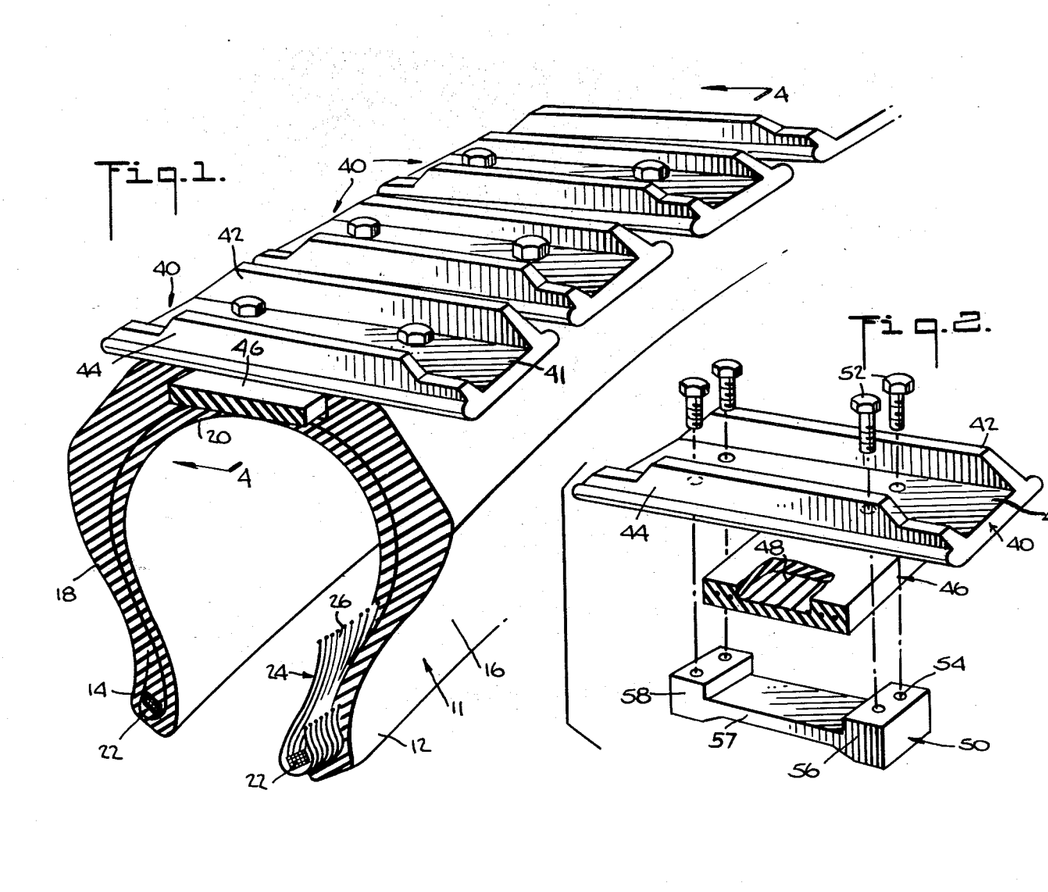
FIG. 1 is a fragmentary, partly sectional, perspective view of a tire equipped with a set of tractive elements in accordance with a preferred embodiment of the present invention.
FIG. 2 is a fragmentary, partly sectional, exploded view of a portion of the belt, one of the tractive elements, and one of the retainer elements of the traction assembly of the tire depicted in FIG. 1.

As shown in FIG. 1, the preferred embodiment of the tire of the present invention includes a pneumatic tire carcass 11. The carcass has a shape generally similar to that of an ordinary passenger car tire. That is, it includes a pair of bead regions 12 and 14, a pair of sidewalls 16 and 18 extending generally radially outwardly from the bead regions, and a crown region 20 extending axially between the radially outward extremities of the sidewalls.

Each of the bead regions 12 and 14 is reinforced by a substantially inextensible bead 22. A ply 24 of reinforcing cords 26 extends throughout the carcass from one bead to the other. The ply of reinforcing cords is arranged so that each cord extends generally radially outwardly from each bead and extends across the crown region 20 of the carcass substantially perpendicularly to the median equatorial plane of the carcass. This arrangement of the reinforcing cords is shown most clearly in FIG. 3.

Figure 3:
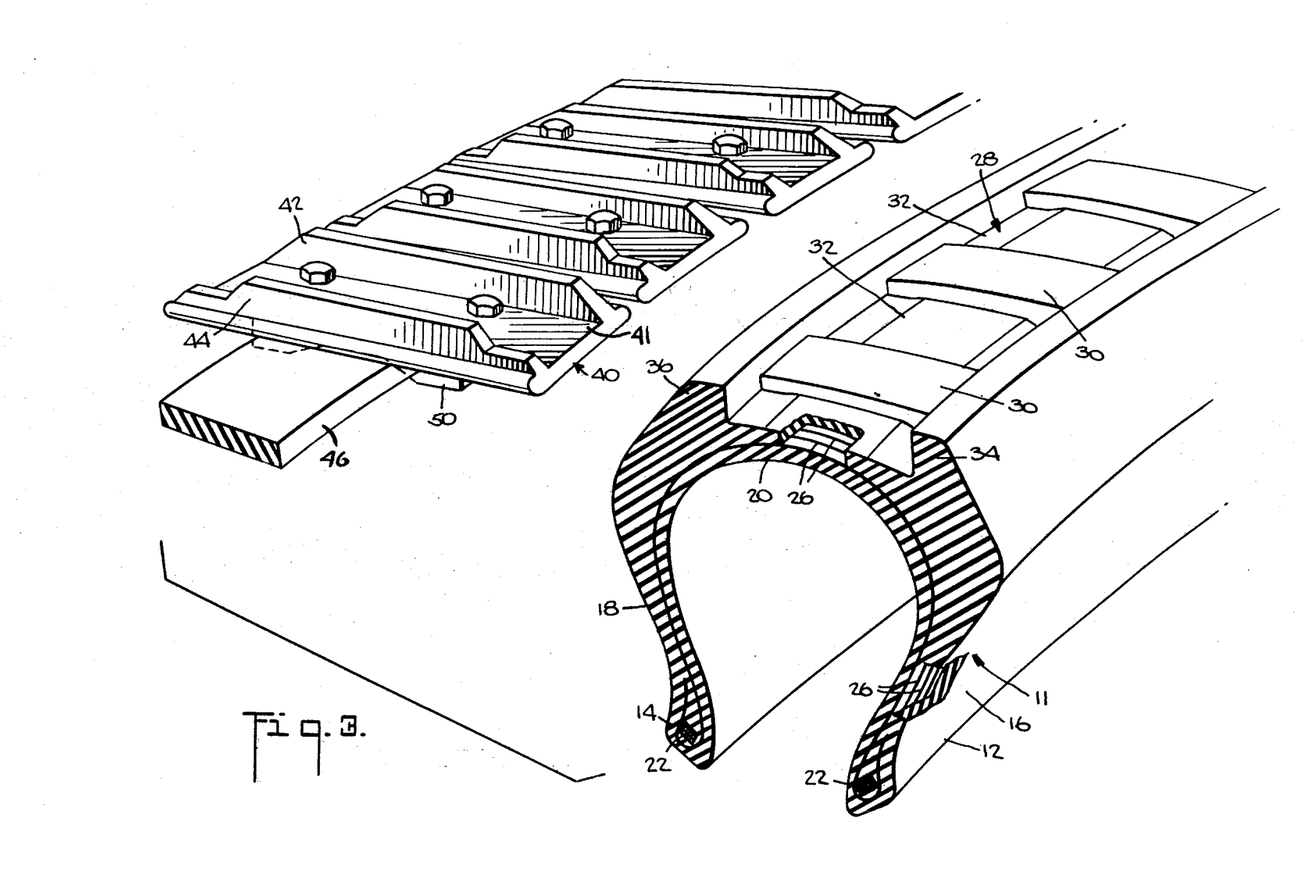
FIG. 3 is a fragmentary, partly sectional, exploded view of the tire carcass and of the traction assembly of the tire depicted in FIG. 1.

The rubber of the carcass is somewhat extensible. That is, it can stretch under the influence of inflation pressure within the carcass. The reinforcing cords 26 prevent each region of the carcass from stretching in the direction parallel to the orientation of the cords within that region. Thus, the sidewalls 16 and 18 cannot stretch radially to any substantial extent because the cords 26 extend generally radially in the sidewall. Similarly, the crown region 20 cannot stretch axially because the cords 26 extend generally axially in the crown region. However, the crown region can stretch circumferentially and radially.

A tread 28 (FIG. 3) is formed integrally with the carcass 11. The tread includes a plurality of axially extending raised features or ribs 30. Each pair of adjacent ribs defines an axially extending groove 32 therebetween.

The tread 28 also includes a pair of radially extending flanges 34 and 36 which are positioned on axially opposite sides of the crown region of the carcass. The flanges extend radially outwardly beyond the ribs 30.

Of course, although only a small arcuate segment of the carcass is illustrated in the drawings, the elements which are illustrated are provided around the entire circumference of the carcass.

As shown in FIGS. 1, 2 and 3, a plurality of tractive elements 40 are mounted around the periphery of the tire. Each tractive element extends generally axially of the tire and includes a web portion 41 and a pair of radially outwardly extending blades 42 and 44.

An endless belt 46 lies radially inwardly of the tractive elements. The belt is constructed so that it is substantially inextensible in the circumferential direction. Preferably, it includes a plurality of flexible but substantially inextensible belt cords 48 (FIG. 2) which extend in the circumferential direction (in the direction of the belt).

A plurality of retainer elements 50 (FIGS. 2 and 3) are provided. In the embodiment shown, an equal number of retainer elements, tractive elements, and grooves are provided so that each retainer element 50 is associated with one tractive element 40 and one groove 32 of tread 28. The retainer elements are mounted radially inwardly of the belt 46, and means for attaching each tractive element to the retainer element associated therewith are provided. In the illustrated embodiment, each retainer element 50 includes a web portion 57 and a pair of projections 56 and 58 at the axially opposite ends of the web portion 57. The belt 46 lies between these projections so that axial motion of the belt relative to the tractive elements and retainer elements is effectively inhibited. The means for attaching the tractive to the retainer elements in each case are in the form of bolts 52 and corresponding threaded holes 54 provided in the projections 56 and 58 of each retainer element 50. The bolts 52 not only attach each tractive element to its associated retainer element, but also act to force each tractive element and its associated retainer element toward one another so that the belt 46 is clamped between them.

Figure 4:
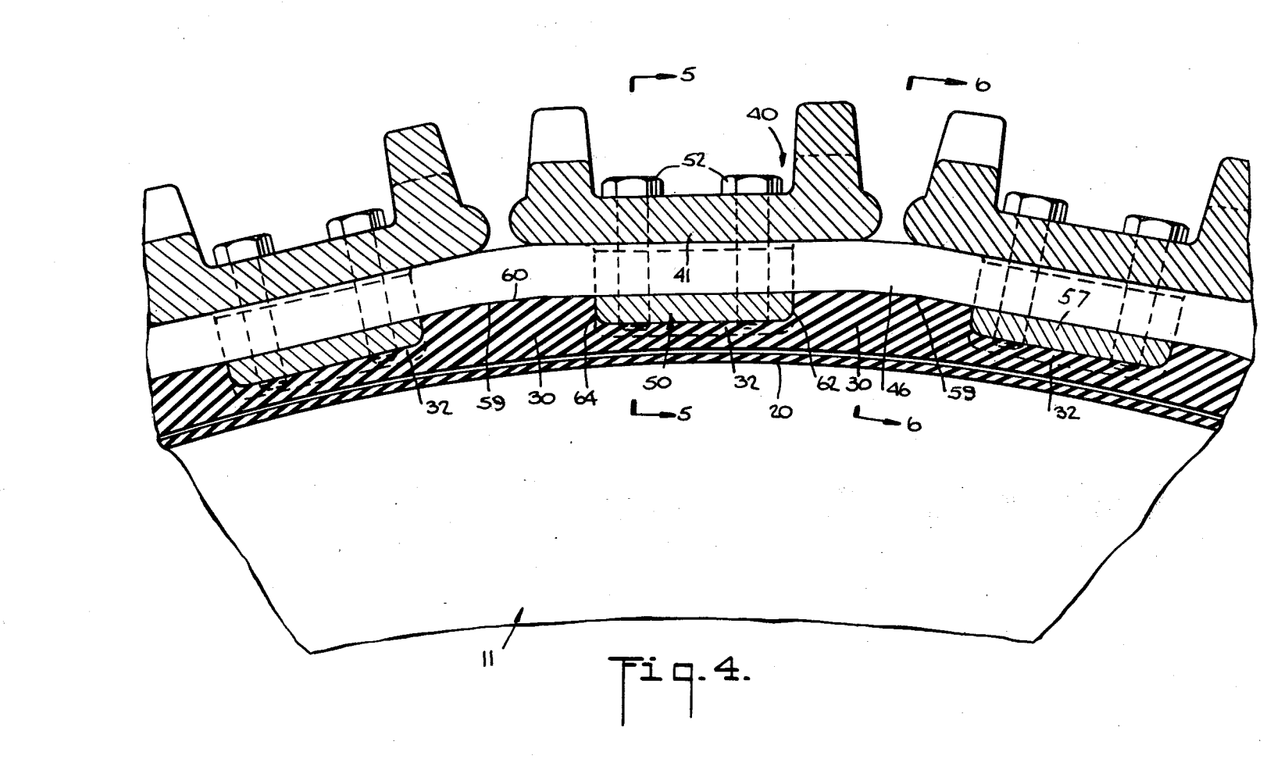
FIG. 4 is a fragmentary sectional view taken along the plane indicated by line 4—4 in FIG. 1.

As shown most clearly in FIG. 4, the endless belt 46 lies radially outwardly of the ribs 30 of tread 28 and extends around the entire circumference of the tire. Under the influence of inflation pressure within the tire, the crown region 20 of the carcass expands radially and circumferentially until the radially outwardmost or top surfaces 59 of the ribs abut the radially inward surface 60 of the belt 46. Thus, the belt 46 is maintained in a taut condition and acts to limit the radial and circumferential expansion of the crown region of the carcass.

One retainer element 50 is positioned within each groove 32 of the tread. Because each retainer element 50 has a circumferential extent substantially equal to the circumferential extent of the groove 32 within which it is mounted, the circumferentially opposite sides 62 and 64 of each retainer element can bear upon the sides of the adjacent ribs 30 which define the groove in which that retainer element is mounted. The belt 46 prevents the retainer elements from moving radially outwardly, and helps to confine them within the grooves 32 of the tread.

As set forth above, each tractive element 40 is linked to its associated retainer element 50 by bolts 52. Thus, circumferentially applied loads such as tractive forces may be transmitted between the tire carcass 11 and the tractive elements 40 by way of the tread ribs 30, the retainer elements 50, and the bolts 52.

The belt 46 is clamped between each tractive element 40 and its associated retainer element 50. Therefore, if a tractive load is applied to one or a few of the tractive elements, the belt will transmit a part of this load around the tire so that it is transmitted through all of the retainer elements and all of the tread ribs. The use of the belt to transmit the tractive forces around the tire allows the entire tractive load to be distributed among all of the retainer elements and tread ribs.

Because the retainer elements 50 are mechanically interlocked with the ribs 30 of the tread in the manner described above, frictional engagement between the retainer elements or the belt and the tire carcass is not required for transmission of tractive loads. The retainer elements, and hence the tractive elements, cannot slip circumferentially of the tire. Since the tire does not depend upon frictional engagement between the retainer elements or the belt and the carcass, there is no need to resort to an extremely high inflation pressure within the tire. The inflation pressure need only be sufficient to support the weight of the vehicle and to maintain the belt in a taut condition.

Figure 5:
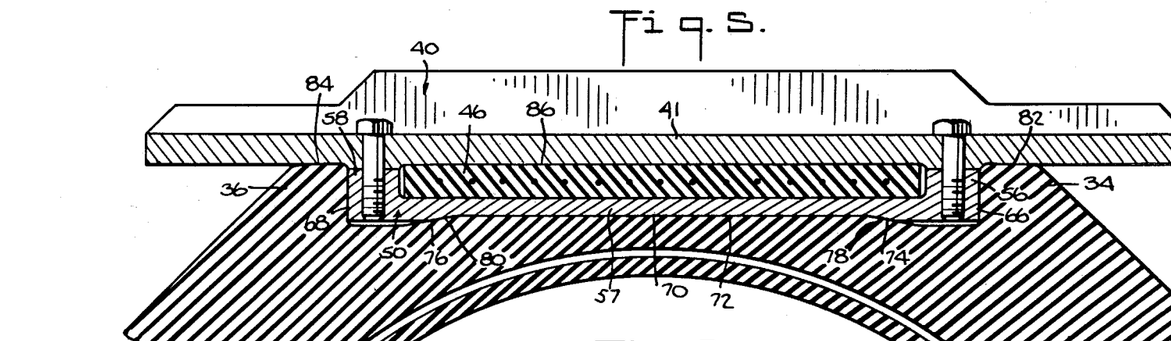
FIGS. 5 and 6 are fragmentary sectional views taken, respectively, along the planes indicated by lines 5—5 and 6—6 in FIG. 4.
Figure 6:
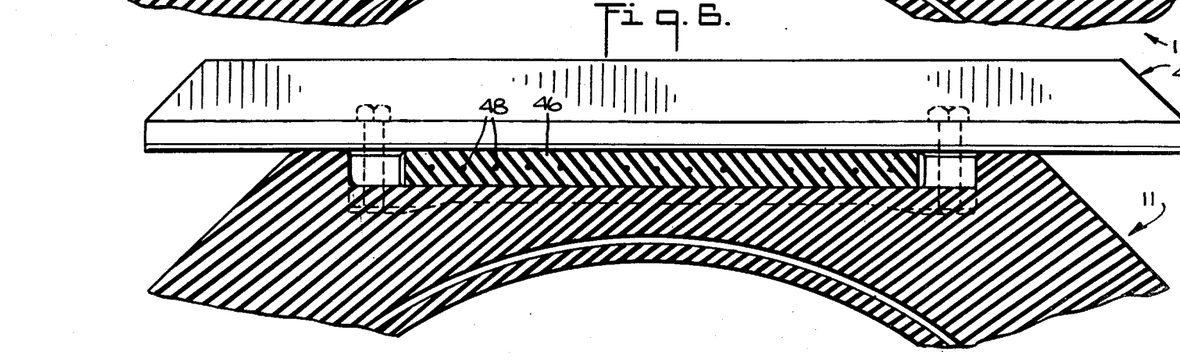

As shown in FIG. 5, the flanges 34 and 36 of the tread extend radially outwardly and closely overlie the axially opposite ends 66 and 68 of each retainer element 50. The flanges will prevent axial movement of the retainer elements relative to the carcass 11. To further reinforce the assembly against such relative axial movement, each of the retainer elements 50 at its web portion 57 includes a radially inward surface 70 which bears on the floor 72 of the groove within which the retainer element is mounted. The radially inward surface 70 of each retainer element web portion includes axially opposite end portions 74 and 76 which slope radially inwardly in the directions away from the median equatorial plane of the tire. These end portions engage corresponding axially opposite end portions 78 and 80 of the associated groove floor 72 which also slope radially inwardly in the directions away from the median equatorial plane. As will be apparent, the retainer elements cannot shift axially relative to the tire carcass 11 without also moving radially outwardly. Because the belt 46 prevents them from moving radially outwardly, therefore, they cannot move axially.

The flanges 34 and 36 each extend radially outwardly to an outermost extent which lies at a radius from the center of the wheel substantially equal to the outermost radius of the belt 46. Radially inward surface portions 82 and 84 of the web portion 41 of each tractive element abut respective underlying portions of the flanges. Therefore, the flanges can transmit radially directed loads, such as the weight of the vehicle, between the tractive elements 40 and the carcass 11. The radially directed loads will also be transmitted from the portion of the inner surface 86 of the web portion 41 of each tractive element which overlies the belt 46, radially inwardly through the belt, and through the retainer elements to the groove floor surface 72.

The action of the flanges in transmitting such radially directed loads is of especial advantage when the tire rolls over an uneven surface. For example, if the right side of the tire rolls over a high spot in the ground while the left side rolls over a low spot or hole, all of the vehicle weight borne by the tire will be transmitted through the right ends of the tractive elements. If only the central portion of the carcass (the groove floors 72) were arranged to transmit radial loads, the tractive elements would be under substantial moments tending to tilt their left ends radially outwardly with respect to the tire. Were it not for the flanges, the belt 46 would have to resist this moment. However, the flange 34 on the right side of the tire acts to buttress the tractive elements against such tilting, and helps to prevent the tilting moments from being applied to the belt.

As set forth above, in this embodiment, the belt performs a dual function. The belt limits the expansion of the crown region of the carcass and, therefore, must resist loads imposed by the inflation pressure within the carcass. The belt also transmits tractive loads around the circumference of the tire, and thus the belt must have sufficient strength to withstand these loads as well. Preferably, the belt is composed of rubber reinforced with one or more layers of circumferentially extending belt cords. For purposes of design of the belt, the strength of the rubber is normally neglected. Thus, the type and number of cords are selected so that the cords themselves will have sufficient strength to withstand the loads applied to the belt.

A conservative over-estimate of the loading due to inflation pressure can be obtained by using the formula:

$$L_i = P \times R \times W$$

wherein $L_i$ is the loading imposed on the belt by inflation pressure, P is the maximum inflation pressure at which the tire is to be utilized, R is the internal radius of the belt, and W is the maximum section width of the tire.

The loadings imposed on the belt by tractive forces cannot be calculated with any exactness. However, as a conservative "rule of thumb" estimate, the tractive load imposed on the belt can be taken as defined by the relation $$L_t = 8 \times V$$

wherein $L_t$ is the tractive loading imposed on the belt during operation, and V is the vehicle weight borne by the tire.

If the weight of the vehicle is borne evenly by all of the tires mounted thereon, then the vehicle weight borne by each tire will simply be the total weight of the vehicle divided by the number of tires.

For the most conservative design, the total load "L" imposed on the belt of each tire can be taken as defined by the relation $$L = L_i + L_t.$$

The number of belt reinforcing cords required to withstand a given total load L will depend on the tensile strength of each cord. Normally, the number of cords in a belt is described in terms of "cords per inch" (the number of cords in a one inch wide segment of the belt). This number C can be selected according to the formula $$C = \frac{L}{B \times S}$$

wherein B is the width of the belt, and S is the tensile strength of each individual cord.

The tractive elements, bolts and retainer elements must be strong enough to resist the loads which they encounter during operation of the tire, and they must be capable of resisting the abrasive effects of sand and other foreign materials. Preferably, they are fabricated from a tough, hard metal such as steel.

As set forth above, the tire carcass preferably has a pair of beads at its radially inwardmost periphery. The carcass is mounted to an ordinary wheel rim of the type used for standard off-the-road equipment tires. The bead regions of the carcass engage the flanges of the rim to hold the carcass to the rim. The flanges of the rim retain the bead regions and prevent them from moving axially outwardly under the influence of inflation pressure within the carcass. Such a carcass can be readily demounted from the rim, to expose its interior surface for inspection and repair.

Because the inflation pressure within the tire need not be any greater than that required to support the weight of the vehicle and to keep the belt taut, the rim flanges and the bead regions of the carcass can safely withstand the axial loadings imposed on them by the inflation pressure within the carcass. Therefore, the chance of a sudden failure of the bead region of the tire or flanges of the rim is minimized, and the safety of the assembly is increased.

A tire in accordance with the embodiment described above can be assembled by slipping the belt over the crown region of the carcass while the tire is in a deflated condition. While the tire is still deflated, the retainer elements can be forced under the belt and into the grooves of the tread which they are to occupy during operation. The tractive elements are then bolted to the retainer elements and the carcass is inflated. Of course, the carcass must be mounted on a wheel rim before it is inflated.

Depending upon the clearance between the interior surface of the belt and the groove floor surfaces in the deflated condition of the carcass, the retainer elements may be somewhat difficult to insert under the belt even with the carcass in a deflated condition, if the embodiment described above is utilized.

Figure 7:
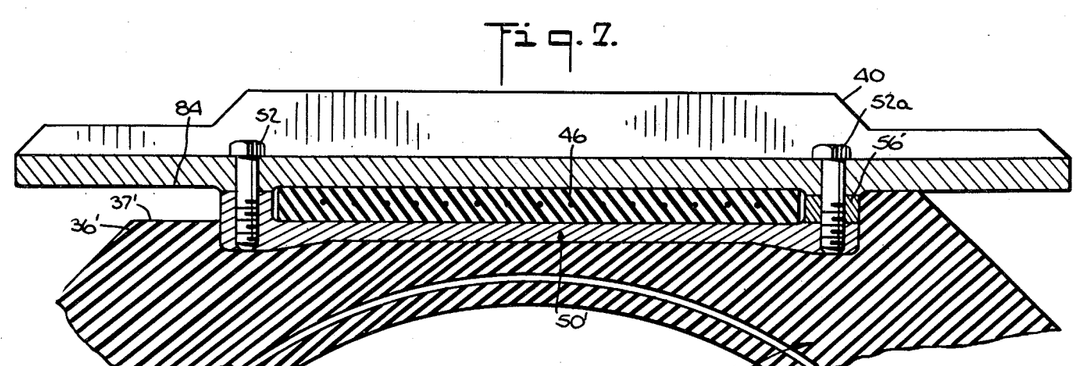
FIGS. 7 and 8 are fragmentary sectional views similar to FIG. 5 but depict a pair of alternate embodiments of the present invention.

To alleviate such difficulties, an alternative embodiment may be employed. As shown in FIG. 7, this embodiment is almost identical with the embodiment shown in FIGS. 1 through 6. However, in the embodiment shown in FIG. 7 one of the projections 56' of each retainer element 50' is formed separately from the remainder of the retainer element. Also, one flange 36' of the tread is smaller. Its radially outwardmost extent 37' lies at a radius from the axis of rotation of the tire approximately equal to the inwardmost radius of the belt 46. Therefore, when the carcass 11' is in a deflated condition and the belt 46 is slack, each retainer element 50' may be readily passed over flange 36' and under the belt 46 until it lies in the groove of the tread. After this has been done, a projection 56' may be mounted to the remainder of each retainer element 50'. In the embodiment shown in FIG. 7, the projection 56' is affixed to the remainder of retainer element 50' by two of the bolts 52a which attach the tractive element 40 to the retainer element. Thus, the bolts act as a means for attaching each separately formed projection to the remainder of the retainer element. Of course, other means for attaching could be utilized, such as clips, pins or rivets.

The separately formed projections depicted in FIG. 7 could also be utilized in an embodiment incorporating the flanges depicted in FIGS. 1 through 6.

Because, in the embodiment shown in FIG. 7, the flange 36' terminates short of the radially inwardmost surface 84 of tractive element 40, it will not serve to transmit radial loads between the tractive elements and the carcass. Therefore, the belt 46 may be subject to some additional loads due to tilting moments applied to the tractive elements when the tire passes over uneven surfaces.

Figure 8:
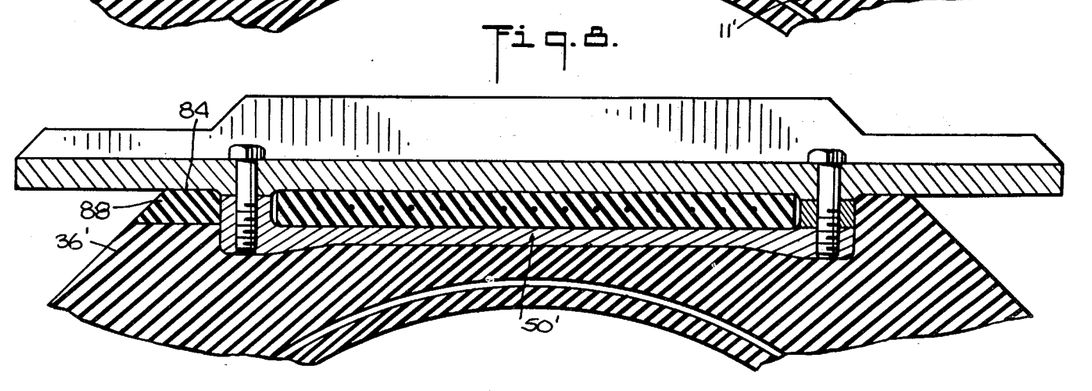

To avoid this, while retaining the ease of mounting achieved with the embodiment shown in FIG. 7, the further alternative embodiment shown in FIG. 8 may be employed. This embodiment is identical with the one shown in FIG. 7, except that a circumferentially extending ring 88 is interposed between the flange 36' and the tractive elements 40. The ring 88 closely overlies the flange 36', and the adjacent, radially inward surface 84 of the web portion 41 of each tractive element 40 closely overlies the radially outwardmost surface of the ring. Therefore, radial loads may be transmitted from each tractive element 40 to the flange 36' by way of the ring 88. During mounting, the ring 88 is placed into position after all of the retainer elements 50' have been positioned in the grooves of the tread but before the carcass has been inflated.

Although all of the embodiments depicted above have equal numbers of tractive elements, retainer elements, and tread grooves, this is not absolutely necessary. For example, one tractive element may be associated with two or more retainer elements. Also by way of example, one groove may accommodate two retainer elements. In such a case, each retainer element would bear on only one of the ribs defining the groove.

The embodiments depicted in FIGS. 1 through 8 each incorporate two means for preventing axial motion of the retainer elements relative to the tire carcass: the flanges and the sloping groove floor surfaces. Although it is preferable to employ both of these means together for preventing such axial motion, one or the other of them can be omitted. If both of them were omitted, of course, the frictional engagement between the tread and the retainer elements and the belt would be the only means remaining to prevent axial motion of the retainer elements and belt relative to the tire carcass, but this would still suffice as long as the service conditions would not be too severe. Even in an embodiment which relies exclusively or principally upon frictional engagement of the retainer elements with the tread to prevent axial motion, however, the tread ribs will still act to transmit tractive loads and inhibit circumferential movement of the tractive elements relative to the carcass.

A representative example of a vehicle tire according to the present invention, substantially as depicted in FIG. 8, may have a radius, to the radially outwardmost extent of the tractive elements of 37.5 inches. That is, the outside diameter of the tire over the tractive elements would be 75 inches. The greatest width of the carcass would be 32 inches. The belt would be 1 inch thick and 15 inches wide, and would include 348 steel cords, each consisting of 49 appropriately twisted and plied steel wires of 0.25 mm diameter. This tire is designed to bear a load of 46,000 pounds and transmit tractive forces of up to 29,000 pounds. For use at its maximum designed loading, the tire would be inflated to a pressure of 100 pounds per square inch.

The foregoing description of the preferred embodiments should not be taken as limiting the scope of the present invention. Many other variations and combinations of the elements set forth hereinabove can be utilized without departing from the spirit of the present invention. For example, instead of a tire having a pair of beads, a so-called "tube tire" of the type set forth in the aforementioned U.S. Pat. No. 3,773,394 can be utilized. Indeed, any type of carcass can be utilized so long as it has a crown region which is radially and circumferentially extensible and so long as the other regions of the carcass can withstand the inflation pressure.

Means for attaching the tractive elements to the retainer elements other than the bolts set forth above may be utilized. For example, each tractive element may be attached to the associated retainer element or elements by various combinations of pins, locking fasteners or adhesives.

Also, although in all of the illustrated embodiments of the invention the raised features of the tread are shown in the form of parallel ribs spaced around the circumference of the carcass but axially coextensive with each other, such a configuration is not absolutely essential. The raised features of the tread could, for example, be formed as a series of single or sets of plural cylindrical or otherwise shaped projections distributed around the circumference of the carcass at suitable generally axial locations and separated from one another by spaces capable of accommodating the retainer elements, and the terms "ribs" and "features" on the one hand and "grooves" on the other thus should be interpreted in this broader sense.

Other means for linking the tractive elements to the raised features of the tread could be utilized. For example, each tractive element could be provided with a recess, and the raised features of the tread could be constructed and arranged to fit into these recesses.

What is claimed is:

1. A vehicle tire comprising:
   (a) a pneumatic tire carcass constructed and arranged so that at least the crown region of said carcass is substantially circumferentially and radially extensible, said carcass having a tread formed integrally therewith and overlying the crown region of said carcass, said tread including a plurality of substantially axially extending, raised ribs spaced around the circumference of the carcass so that each pair of adjacent ribs defines a generally axially extending groove therebetween;
   (b) a flexible endless belt extending circumferentially around said carcass radially outwardly of said ribs, said belt being substantially inextensible at least in the circumferential direction;
   (c) a plurality of axially extending retainer elements mounted generally radially inwardly of said belt so that each of said retainer elements lies in a respective one of said grooves, each one of said retainer elements having a pair of projections at axially opposite ends, said projections extending radially outwardly beyond the radially inwardmost surface of said belt on axially opposite sides of said belt and confining said belt therebetween to limit axial motion of said belt relative to said retainer elements, at least one of the projections of each retainer element being formed separately from the remainder of that retainer element;
   (d) means for releasably attaching each such separately formed projection to the remainder of the retainer element associated therewith;
   (e) a plurality of tractive elements mounted around the periphery of said tire radially outwardly of said belt, each of said tractive elements being associated with at least one of said retainer elements;
   (f) means for releasably attaching said tractive elements to the respective retainer elements associated therewith; and
   (g) means for preventing axial motion of said retainer elements relative to said carcass while said carcass is inflated, said means for preventing axial motion of said retainer elements including a pair of circumferentially and radially extending flanges formed integrally with said carcass and closely abutting the axially opposite ends of said retainer elements, one of said flanges having an outermost radius smaller than that of the other of said flanges and substantially equal to the innermost radius of said belt when the latter is disposed around said tread, said retainer elements lying in said grooves so that each separately formed projection of said retainer elements lies on the axially opposite side of said tire from said one flange;
   (h) whereby upon inflation of said carcass with the assembly constituted of said belt, said tractive elements and said retainer elements positioned around said tread, said crown region of said carcass is expanded against said assembly to maintain the same taut on said carcass and complete the tire, and the tire may be partially disassembled for maintenance by releasing the tractive elements from the retainer elements, deflating the carcass, releasing each separately formed projection from the remainder of its respective retainer element, and sliding the said respective retainer element axially of the carcass over said one flange and out from under said belt.

2. A tire as claimed in claim 1, wherein said means for releasably attaching a tractive element to an associated retainer element having a separately formed projection also serves as said means for releasably attaching that separately formed projection to the said retainer element.

3. A tire as claimed in claim 2, wherein each of said tractive elements is associated with a respective one of said retainer elements, and said means for releasably attaching each of said tractive elements to an associated retainer element having a separately formed projection includes a bolt extending from that tractive element through the separately formed projection of the retainer element associated therewith to the remainder of that retainer element.

4. A tire as claimed in claim 1, wherein each of said grooves has a radially inwardmost floor surface at least one portion of which slopes radially inwardly of said carcass in the axial direction away from the median equatorial plane of said carcass, the radially inwardmost surface of each one of said retainer elements is correspondingly constructed and arranged to bear upon and mechanically interlock with the floor surface of the groove in which that retainer element lies, and said means for preventing axial motion of said retainer elements includes said floor surfaces and said radially inwardmost surfaces of said retainer elements.

5. A tire as claimed in claim 4, wherein each of said floor surfaces includes axially opposite end portions which slope radially inwardly in respective directions away from the median equatorial plane of the tire.

6. A tire as claimed in claims 1, 4 or 5, further comprising a ring formed separately from said carcass extending around said carcass immediately radially outwardly of said one flange and abutting said one flange, said ring also abutting the radially inwardmost surfaces of the overlying portions of said tractive elements, whereby said ring and said one flange serve to transmit radial loads from said tractive elements to said carcass on that side of the tire.

7. A tire as claimed in claim 6, wherein said other flange extends radially outwardly to the radially inwardmost surfaces of the overlying portions of said tractive elements, whereby said other flange serves to transmit radial loads from said tractive elements to said carcass on that side of the tire.

* * * * *